US012809921B2

(12) United States Patent
Furukawa

(10) Patent No.: US 12,809,921 B2
(45) Date of Patent: Nov. 24, 2026

(54) INFORMATION PROCESSING APPARATUS, INFORMATION PROCESSING METHOD, AND INFORMATION PROCESSING PROGRAM

(71) Applicant: LY Corporation, Tokyo (JP)

(72) Inventor: Taichi Furukawa, Tokyo (JP)

(73) Assignee: LY CORPORATION, Tokyo (JP)

( * ) Notice: Subject to any disclaimer, the term of this patent is extended or adjusted under 35 U.S.C. 154(b) by 0 days.

(21) Appl. No.: 19/208,281

(22) Filed: May 14, 2025

(65) Prior Publication Data

US 2025/0390537 A1 Dec. 25, 2025

(30) Foreign Application Priority Data

Jun. 20, 2024 (JP) ................................ 2024-099302

(51) Int. Cl.
*G06F 16/903* (2019.01)
*G06F 16/9035* (2019.01)

(52) U.S. Cl.
CPC .... *G06F 16/90335* (2019.01); *G06F 16/9035* (2019.01)

(58) Field of Classification Search
None
See application file for complete search history.

(56) References Cited

U.S. PATENT DOCUMENTS

2009/0037355 A1* 2/2009 Brave ................. G06F 16/9535 706/45
2014/0108445 A1* 4/2014 Oztekin ............. G06F 16/9535 707/767
2014/0114744 A1* 4/2014 Koningstein ...... G06Q 30/0244 705/14.43
2016/0042428 A1* 2/2016 Gou ................... G06Q 30/0631 705/26.7
2018/0266832 A1* 9/2018 Suzuki ................. G01C 21/343
2019/0392487 A1* 12/2019 Duke ..................... G06N 20/00
2022/0014952 A1* 1/2022 Li ........................ G06F 11/3438

FOREIGN PATENT DOCUMENTS

JP 2017-021469 A 1/2017

* cited by examiner

*Primary Examiner* — Christopher J Raab
(74) *Attorney, Agent, or Firm* — Procopio, Cory, Hargreaves & Savitch LLP

(57) ABSTRACT

An information processing apparatus according to the present application includes an estimation unit that estimates values of each user of a user group satisfying a predetermined user condition, a specifying unit that specifies a search query having high affinity with values satisfying a predetermined values condition among the estimated values among search queries input in the past, and a provision unit that provides content based on the specified search query.

20 Claims, 9 Drawing Sheets

FIG.4

| USER ID | ATTRIBUTE INFORMATION | BEHAVIOR HISTORY | ... |
|---|---|---|---|
| U1 | ATTRIBUTE INFORMATION #1 | BEHAVIOR HISTORY #1 | ... |
| ... | ... | ... | ... |

FIG.5

| VALUES ID | NAME | ESTIMATED CONTENT |
|---|---|---|
| V1 | VALUES A #1 | ESTIMATED CONTENT #1 |
| ... | ... | ... |

FIG.6

| QUERY ID | QUERY CONTENT | INPUT DATE AND TIME | INPUT USER |
|---|---|---|---|
| Q1 | QUERY CONTENT #1 | INPUT DATE AND TIME #1 | USER ID #1 |
| ... | ... | ... | ... |

FIG.7

| MODEL ID | OUTPUT CONTENT | MODEL PARAMETER |
|---|---|---|
| M1 | OUTPUT CONTENT #1 | MODEL PARAMETER #1 |
| ... | ... | ... |

INFORMATION PROCESSING APPARATUS, INFORMATION PROCESSING METHOD, AND INFORMATION PROCESSING PROGRAM

CROSS-REFERENCE TO RELATED APPLICATIONS

The present application claims priority to and incorporates by reference the entire contents of Japanese Patent Application No. 2024-099302 filed in Japan on Jun. 20, 2024.

BACKGROUND OF THE INVENTION

1. Field of the Invention

The present invention relates to an information processing apparatus, an information processing method, and an information processing program.

2. Description of the Related Art

Conventionally, a technology for assisting a content provider to provide optimum content to a user on the basis of information obtained from a user has been widespread.

However, in the related art, there is room for improvement in terms of more effective support regarding content provision.

SUMMARY OF THE INVENTION

An information processing apparatus according to the present application includes an estimation unit that estimates values of each user of a user group satisfying a predetermined user condition, a specifying unit that specifies a search query having high affinity with values satisfying a predetermined values condition among the estimated values among search queries input in the past, and a provision unit that provides content based on the specified search query.

BRIEF DESCRIPTION OF THE DRAWINGS

FIG. 4 is a diagram illustrating an example of user information;

FIG. 5 is a diagram illustrating an example of values information;

FIG. 6 is a diagram illustrating an example of query information;

FIG. 7 is a diagram illustrating an example of model information;

DETAILED DESCRIPTION OF THE PREFERRED EMBODIMENTS

Figure 1:
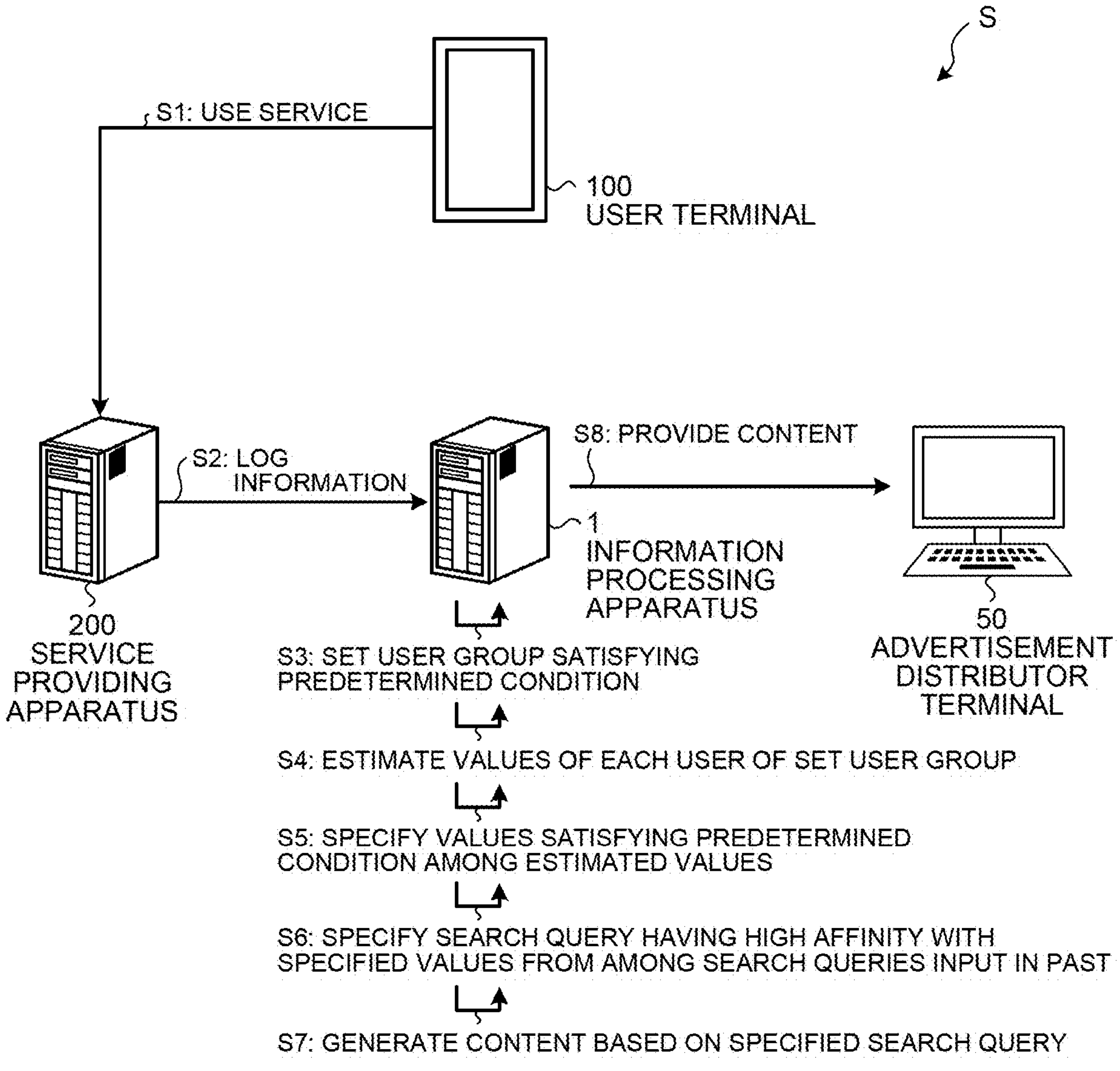
FIG. 1 is a diagram illustrating processing executed by an information processing apparatus according to an embodiment.

Hereinafter, modes (hereinafter, referred to as an "embodiment") for implementing an information processing apparatus, an information processing method, and an information processing program according to the present application will be described in detail with reference to the drawings. Note that the information processing apparatus, the information processing method, and the information processing program according to the present application are not limited by the embodiment. In the following embodiments, the same parts are denoted by the same reference numerals, and redundant description will be omitted.

EMBODIMENT

First, processing executed by the information processing apparatus according to the embodiment will be described with reference to FIG. 1. FIG. 1 is a diagram illustrating processing executed by the information processing apparatus according to the embodiment. Hereinafter, an example will be described in which an information processing apparatus 1 provides content related to measures and the like for an advertisement distributor to distribute an advertisement to a user. Note that FIG. 1 illustrates an operation example of an information processing system S including the information processing apparatus 1 according to the embodiment.

As illustrated in FIG. 1, an information processing system S according to the embodiment includes the information processing apparatus 1, an advertisement distributor terminal 50, a user terminal 100, and a service providing apparatus 200.

As illustrated in FIG. 1, the information processing system S according to the embodiment estimates values of each user of a user group satisfying a predetermined user condition, specifies a search query having high affinity with values satisfying a predetermined values condition among the estimated values among search queries input in the past, and provides content based on the specified search query.

Specifically, first, the user who owns the user terminal 100 uses a service provided by the service providing apparatus 200 via the user terminal 100 (step S1). The service provided by the service providing apparatus 200 is, for example, an online site, and is a Q&A site, a news site, an electronic commerce (EC) site, a map site, an image posting site, a moving image browsing site, or the like, but is not limited to such an example. The EC site is, for example, a shopping site, an auction site, or the like, but is not limited to such an example.

The service providing apparatus 200 receives posted content which is content posted by each user on the Q&A site, and provides the posted content to each user. In the Q&A site, the posted content is question content that is a question sentence, answer content that is an answer sentence to the question sentence, or the like.

Furthermore, the service providing apparatus 200 receives a news article as posted content on the news site, and provides the posted content to each user. In the news site, in addition to the news article, posted content on the news site includes comments, evaluations, and the like posted to the news article.

Furthermore, the service providing apparatus 200 receives, as posted content, product content such as a product explanation indicating introduction content of a product from a seller in the EC site, and provides the posted content to each user. Furthermore, the posted content on the EC site includes, in addition to the product content, comments, evaluations, and the like posted on the product.

Furthermore, the service providing apparatus 200 receives image content (for example, still image content or moving image content) and the like as posted content on the image posting site, and provides the posted content to each user. Furthermore, the service providing apparatus 200 receives a title, caption text, and the like in the moving image content as posted content on the moving image browsing site, and provides the posted content to each user.

Furthermore, the service providing apparatus 200 receives designation of a position and a range from a user U on the map site, and provides map content indicating a map of the position and the range designated by the user. The map content includes, for example, various types of information such as roads, various landmarks, various stores, routes, and stations.

Subsequently, the service providing apparatus 200 provides log information, which is a behavior log of the user at the time of using the service, to the information processing apparatus 1 (step S2). For example, the service providing apparatus 200 provides the behavior of the user in the provided online site as log information. Specifically, the service providing apparatus 200 provides log information including browsing behavior, posting behavior, and Q&A search behavior on the Q&A site.

In addition, the service providing apparatus 200 provides log information including browsing behavior, posting behavior, and news search behavior on the news site. In addition, the service providing apparatus 200 provides log information including browsing behavior, posting behavior, purchase behavior, and product search behavior on the EC site. In addition, the service providing apparatus 200 provides log information including browsing behavior, posting behavior, and image search behavior on the image posting site. In addition, the service providing apparatus 200 provides log information including a designation behavior of a position or a range on a map site and a search behavior of the position or the range.

Subsequently, the information processing apparatus 1 sets a user group satisfying a predetermined user condition on the basis of the log information (step S3). For example, the information processing apparatus 1 sets a user group who has performed a predetermined behavior on the online site provided by the service providing apparatus 200 as a user group satisfying a predetermined user condition. The predetermined behavior is, for example, behavior related to the content designated by the advertisement distributor.

For example, the information processing apparatus 1 sets, as a user group satisfying a predetermined user condition, a user group who has performed browsing behavior or posting behavior related to a designated content on the news site. In addition, the information processing apparatus 1 sets, as a user group satisfying a predetermined user condition, a user group who has performed browsing behavior or posting behavior related to a designated content on the Q&A site. In addition, the information processing apparatus 1 sets, as a user group satisfying a predetermined user condition, a user group who has performed browsing behavior, posting behavior, or purchasing behavior related to a designated content on the EC site. In addition, the information processing apparatus 1 sets, as a user group satisfying a predetermined user condition, a user group who has performed browsing behavior or posting behavior related to a designated content on the image posting site. In addition, the information processing apparatus 1 sets, as a user group satisfying a predetermined user condition, a user group who has performed designation behavior or posting behavior related to a designated content on the map site.

Subsequently, the information processing apparatus 1 estimates values of each user of the set user group (step S4). The values are, for example, values classified into freedom, equality, benevolence, and harmony, but are not limited to such an example, and may be, for example, values classified into traditionalism, success orientation, pursuit of self-realization, coexistence orientation, or the like, or may be other values. For example, in a case where the object is a car, the values may be classified into, for example, putting a premium on safety, comfortability, design, and traveling performance, and in a case where the object is a house, the values may be classified into, for example, putting a premium on location, price, room layout, design, and future prospects. Furthermore, the values may be values based on Schwartz's value theory, and in this case, the values are values classified into power, achievement, hedonism, stimulation, self-determination, universality, benevolence, traditional, harmony, and safety.

For values (the character string thereof) set in advance, the information processing apparatus 1 generates constituents included in the content which is highly likely to be browsed by the user having the values as the estimated content. The estimated content can be generated, for example, by inputting a prompt including the values and the information of the content using the generative AI. Then, the information processing apparatus 1 gives a score of respective values based on the similarity with the estimated content to each content to be browsed in advance. The similarity is, for example, vector similarity (cosine similarity, Jaccard similarity, and the like) of vectorized (embedding with a language model, Doc2Vec, word embedding, and the like) content. For example, the information processing apparatus 1 then sets the score of each of the values for each user on the basis of the score of respective values given to the content browsed by the user. For example, the information processing apparatus 1 sums up scores of the respective values in the content groups browsed by the user, and calculates a score normalized by the number of content groups as a score (hereinafter, referred to as values score) of respective values.

Subsequently, the information processing apparatus 1 specifies values that satisfy a predetermined values condition among the estimated values (step S5). For example, the information processing apparatus 1 calculates a lift value indicating the likelihood of holding the values in the user group on the basis of the estimated values of each user, and specifies values having a lift value equal to or more than (or less than) a threshold as values satisfying a predetermined values condition. Details of a method of calculating the lift value will be described later with reference to FIG. 8. In the following description, values having a lift value equal to or greater than the threshold are referred to as positive values, and values having a lift value less than the threshold are referred to as negative values. Note that the separation between the positive values and the negative values is not limited to a simple threshold, and for example, in a case where there are the first user group and the second user group, for the first user group, values having a lift value higher than the lift value of the second user group (and further, the difference is a predetermined threshold or more) may be set as the positive values. For the first user group, values having the lift value lower than the lift value of the second user group (and further, the difference is a predetermined threshold or more) may be set as the negative values.

Subsequently, the information processing apparatus 1 specifies a search query having high affinity with the specified values (positive values and negative values) from among the search queries input in the past (step S6). For example, the information processing apparatus 1 vectorizes the search query and the values using Word2Vec or the like, and specifies that the search query and the values having high vector similarity (equal to or greater than a threshold) due to cosine similarity or the like have high affinity. Furthermore, the information processing apparatus 1 may inquire whether or not the affinity between the search query and the values is high using the generative AI. Note that the search query is, for example, a search query input on a search site, but is not limited thereto, and may be, for example, a search query input in various search behaviors included in the log information.

Subsequently, the information processing apparatus 1 generates content based on the specified search query (step S7), and provides the generated content to the advertisement distributor terminal 50 (step S8).

For example, the information processing apparatus 1 provides information of the search query having high affinity with each of the positive values and the negative values to the advertisement distributor. Furthermore, the information processing apparatus 1 extracts a search query in which the number of users who have input the search query in the user group is less than a threshold (or equal to or greater than the threshold) among search queries having high affinity with positive values (or negative values), and provides information of the extracted search query to the advertisement distributor. As a result, the advertisement distributor can accurately determine a distribution measure (which search query is used to distribute the advertisement, and the like) in the search query-linked advertisement distribution.

Furthermore, the information processing apparatus 1 may provide the advertisement distributor with the content generated by the generative AI with the specified or extracted search query as a prompt. This point will be described later in detail with reference to FIGS. 9 to 12.

As described above, according to the information processing apparatus 1 according to the embodiment, it is possible to provide the advertisement distributor with content (for example, measures for advertisement distribution, and the like) based on the search query having high affinity with the user's values. As a result, the advertisement distributor can distribute an advertisement that matches the user's values. That is, according to the information processing apparatus 1 according to the embodiment, it is possible to effectively support advertisement distributors and the like regarding content provision.

Figure 2:
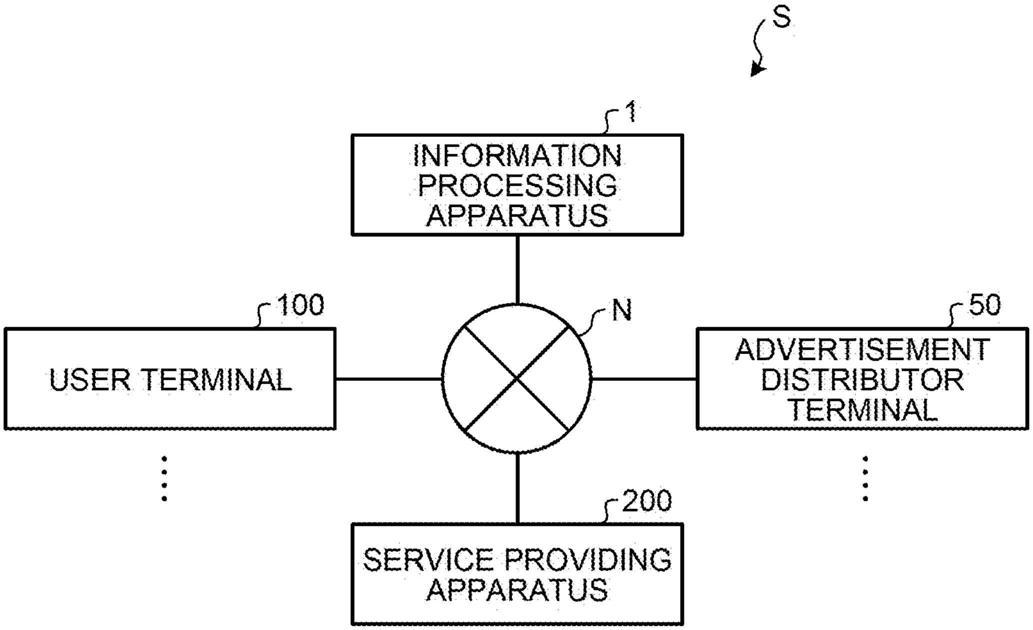
FIG. 2 is a diagram illustrating a configuration example of an information processing system according to an embodiment.

Next, a configuration example of the information processing system S according to the embodiment will be described with reference to FIG. 2. FIG. 2 is a block diagram illustrating a configuration example of the information processing system S according to the embodiment. As illustrated in FIG. 2, in the information processing system S according to the embodiment, an information processing apparatus 1, a plurality of advertisement distributor terminals 50, a plurality of user terminals 100, and a service providing apparatus 200 are connected to a network N in a wired or wireless manner. The network N is, for example, a network such as the Internet, a wide area network (WAN), or a local area network (LAN).

The information processing apparatus 1 is a server apparatus that executes the information processing method according to the embodiment. The information processing apparatus 1 estimates values of each user of a user group satisfying a predetermined user condition, specifies a search query having high affinity with values satisfying a predetermined values condition among the estimated values among search queries input in the past, and provides content based on the specified search query.

Furthermore, the information processing apparatus 1 is an information processing apparatus that cooperates with the plurality of advertisement distributor terminals 50, the plurality of user terminals 100, and the service providing apparatus 200 to provide an application programming interface (API) service or the like for various applications (hereinafter, an app) or the like and various data to the plurality of advertisement distributor terminals 50, the plurality of user terminals 100, and the service providing apparatus 200, and is implemented by a server apparatus, a cloud system, or the like.

Furthermore, the information processing apparatus 1 may be an information processing apparatus that provides some kind of Web service online to the plurality of advertisement distributor terminals 50, the plurality of user terminals 100, and the service providing apparatus 200. For example, the information processing apparatus 1 may provide, as Web services, services such as Internet connection, a search service, a social networking service (SNS), electronic commerce (EC), electronic payment, an online game, online banking, online trading, lodging/ticket reservation, moving image/music distribution, news, a map, a route search, route guidance, route information, operation information, and weather forecast. In practice, the information processing apparatus 1 may mediate the Web service in cooperation with various servers that provide the Web service as described above, or may be in charge of processing the Web service.

The advertisement distributor terminal 50 is a terminal device managed by a distributor that distributes an advertisement to a user. As the advertisement distributor terminal 50, any type of terminal device such as a smartphone, a desktop PC, a notebook PC, or a tablet PC can be used. The advertisement distributor terminal 50 transmits various kinds of information to the information processing apparatus 1 and the like, and receives information provided from the information processing apparatus 1 and the like.

The user terminal 100 is a terminal device possessed by a user who uses a service provided by the service providing apparatus 200. As the user terminal 100, any type of terminal device such as a smartphone, a desktop PC, a notebook PC, or a tablet PC can be used. The user terminal 100 transmits various types of information to the information processing apparatus 1 and the like, and receives information provided from the information processing apparatus 1 and the like.

The service providing apparatus 200 is an information processing apparatus that provides various services to a user. The service providing apparatus 200 is implemented by a server apparatus, a cloud system, or the like.

Next, a configuration example of the information processing apparatus 1 will be described with reference to FIG. 3.

Figure 3:
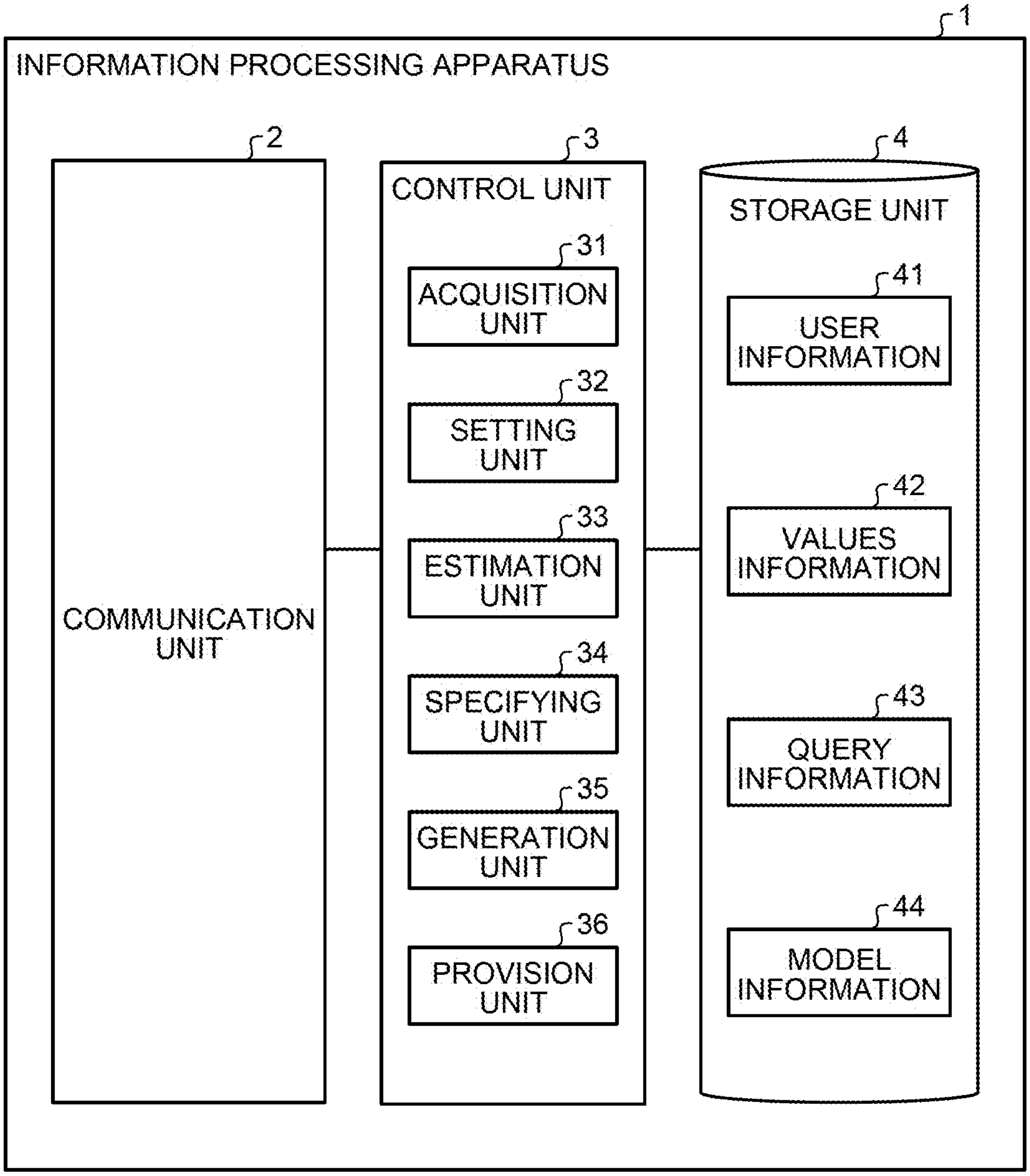
FIG. 3 is a diagram illustrating a configuration example of the information processing apparatus according to an embodiment.

FIG. 3 is a diagram illustrating a configuration example of the information processing apparatus 1 according to the embodiment. As illustrated in FIG. 3, the information processing apparatus 1 includes a communication unit 2, a control unit 3, and a storage unit 4. The control unit 3 includes an acquisition unit 31, a setting unit 32, an estimation unit 33, a specifying unit 34, a generation unit 35, and a provision unit 36. The storage unit 4 stores user information 41, values information 42, query information 43, and model information 44.

The communication unit 2 is implemented by, for example, a network interface card (NIC) or the like. The communication unit 2 is connected to a network in a wired or wireless manner.

The control unit 3 is a controller, and is implemented by, for example, a processor such as a central processing unit (CPU) or a micro processing unit (MPU) executing various programs (corresponding to an example of an information processing program) stored in a storage device inside the information processing apparatus 1 using a RAM or the like as a work area. Furthermore, the control unit 3 is a controller, and may be implemented by, for example, an integrated circuit such as an application specific integrated circuit (ASIC), a field programmable gate array (FPGA), or a general purpose graphic processing unit (GPGPU).

The storage unit 4 is implemented by, for example, a semiconductor memory element such as a random access memory (RAM) or a flash memory, or a storage device such as a hard disk or an optical disk.

The user information 41 is information regarding the user.

FIG. 4 is a diagram illustrating an example of the user information 41. As illustrated in FIG. 4, the user information 41 includes items such as "user ID", "attribute information", and "behavior history".

The "user ID" is identification information for identifying the user. The "attribute information" is information regarding the attribute of the user. The attribute information includes, for example, a psychographic attribute, a demographic attribute, and the like. The "behavior history" is information of a behavior history of the user, and is, for example, a search behavior, a purchasing behavior, a posting behavior, or the like.

The values information 42 is information including estimated content used by the estimation unit 33 described later to estimate values.

FIG. 5 is a diagram illustrating an example of the values information 42. As illustrated in FIG. 5, the values information 42 includes items such as "values ID", "name", and "estimated content".

The "values ID" is identification information for identifying respective values. The "name" is a name (character string) indicating values. For example, the name includes freedom, equality, benevolence, harmony, traditionalism, success orientation, pursuit of self-realization, coexistence orientation, putting a premium on safety, comfortability, design, and traveling performance, putting a premium on location, price, room layout, design, and future prospects, power, achievement, hedonism, stimulation, self-determination, universality, benevolence, traditional, harmony, safety, and the like. The "estimated content" is content having a high possibility of being browsed by a user having certain values, and is, for example, content generated by the generative AI.

The query information 43 is information of a search query input by the user in the past.

FIG. 6 is a diagram illustrating an example of the query information 43. As illustrated in FIG. 6, the query information 43 includes items such as "query ID", "query content", "input date and time", and "input user".

The "query ID" is identification information for identifying each query ID. The "query content" is a word (character string) or the like serving as a search query. The "input date and time" is information on the date and time when the search query is input. The "input user" is information of the user who has input the search query, and for example, the user ID in the user information 41 described above is input.

The model information 44 is information including a model of generative AI used by the generation unit 35 to be described later to generate content.

FIG. 7 is a diagram illustrating an example of the model information 44. As illustrated in FIG. 7, the model information 44 includes items such as "model ID", "output content", and "model parameter".

The "model ID" is identification information for identifying respective models. The "output content" is information indicating content output by the model, and details thereof will be described later with reference to FIGS. 9 to 12. The "model parameter" is a weight value or the like used for a neural network or a deep learning algorithm constituting the model.

Next, each function of the control unit 3 of the information processing apparatus 1 (the acquisition unit 31, the setting unit 32, the estimation unit 33, the specifying unit 34, the generation unit 35, and the provision unit 36) will be described.

The acquisition unit 31 acquires various types of information. For example, the acquisition unit 31 acquires log information from the service providing apparatus 200. In addition, the acquisition unit 31 acquires log information of a search query from a search server (not illustrated).

The setting unit 32 sets a user group satisfying a predetermined user condition on the basis of the log information acquired by the acquisition unit 31. For example, the setting unit 32 sets a user group satisfying a predetermined user condition on the basis of the log information. For example, the setting unit 32 sets a user group who has performed a predetermined behavior on the online site provided by the service providing apparatus 200 as a user group satisfying a predetermined user condition. The predetermined behavior is, for example, behavior related to the content designated by the advertisement distributor.

For example, the setting unit 32 sets, as a user group satisfying a predetermined user condition, a user group who has performed browsing behavior or posting behavior related to a designated content on the news site. In addition, the setting unit 32 sets, as a user group satisfying a predetermined user condition, a user group who has performed browsing behavior or posting behavior related to a designated content on the Q&A site. In addition, the setting unit 32 sets, as a user group satisfying a predetermined user condition, a user group who has performed browsing behavior, posting behavior, or purchasing behavior related to a designated content on the EC site. In addition, the setting unit 32 sets, as a user group satisfying a predetermined user condition, a user group who has performed browsing behavior or posting behavior related to a designated content on the image posting site. In addition, the setting unit 32 sets, as a user group satisfying a predetermined user condition, a user group who has performed designation behavior or posting behavior related to a designated content on the map site.

The estimation unit 33 estimates values of each user of the set user group. The values are, for example, values classified into freedom, equality, benevolence, and harmony, but are not limited to such an example, and may be, for example, values classified into traditionalism, success orientation, pursuit of self-realization, coexistence orientation, or the like, or may be other values. For example, in a case where the object is a car, the values may be classified into, for example, putting a premium on safety, comfortability, design, and traveling performance, and in a case where the object is a house, the values may be classified into, for example, putting a premium on location, price, room layout, design, and future prospects. Furthermore, the values may be values based on Schwartz's value theory, and in this case, the values are values classified into power, achievement, hedonism, stimulation, self-determination, universality, benevolence, traditional, harmony, and safety.

For preset values (the character string thereof), the estimation unit 33 generates constituents included in the content which is highly likely to be browsed by the user having the values as the estimated content. The estimated content can be generated, for example, by inputting a prompt including the values and the information of the content using the generative AI. Then, the estimation unit 33 gives a score of respective values based on the similarity with the estimated content to each content to be browsed in advance. The similarity is, for example, vector similarity (cosine similarity, Jaccard similarity, and the like) of vectorized (embedding with a language model, Doc2Vec, word embedding, and the like) content. For example, the estimation unit 33 then sets a score of respective values for each user on the basis of the score of respective values given to the content browsed by the user. For example, the estimation unit 33 sums up scores of the respective values in the content groups browsed by the user, and calculates a score normalized by the number of content groups as a score (hereinafter, referred to as values score) of respective values. Then, the estimation unit 33 estimates values whose calculated values score is equal to or higher than a threshold as values that the user has. Note that the estimated content is not limited to the content browsed by the user, and may be any content as long as it is content related to the user, such as content posted by the user.

The specifying unit 34 specifies values that satisfy a predetermined values condition among the estimated values. For example, the specifying unit 34 calculates a lift value indicating the likelihood of holding the values in the user group on the basis of the estimated values of each user, and specifies values having a lift value equal to or more than (or less than) a threshold as values satisfying a predetermined values condition. Details of a method of calculating the lift value will be described later with reference to FIG. 8. In the following description, values having a lift value equal to or greater than the threshold are referred to as positive values, and values having a lift value less than the threshold are referred to as negative values. Note that the separation between the positive values and the negative values is not limited to a simple threshold, and for example, in a case where there are the first user group and the second user group, for the first user group, values having a lift value higher than the lift value of the second user group (and further, the difference is a predetermined threshold or more) may be set as the positive values. For the first user group, values having the lift value lower than the lift value of the second user group (and further, the difference is a predetermined threshold or more) may be set as the negative values.

Subsequently, the specifying unit 34 specifies a search query having high affinity with the specified values (positive values and negative values) from among the search queries input in the past. For example, the specifying unit 34 vectorizes the search query and the values using Word2Vec or the like, and specifies that the search query and the values having high vector similarity (equal to or greater than a threshold) due to cosine similarity or the like have high affinity. Furthermore, the specifying unit 34 may inquire whether or not the affinity between the search query and the values is high using the generative AI. Note that the search query is, for example, a search query input on a search site, but is not limited thereto, and may be, for example, a search query input in various search behaviors included in the log information.

The generation unit 35 generates content based on the specified search query. For example, the generation unit 35 generates information of the search query having high affinity with each of the positive values and the negative values. Furthermore, the generation unit 35 extracts a search query in which the number of users who have input the search query in the user group is less than a threshold (or equal to or greater than the threshold) among search queries having high affinity with positive values (or negative values), and generates information of the extracted search query.

Furthermore, the generation unit 35 may generate the content by using the generative AI with the specified or extracted search query as a prompt, and details of such a point will be described later with reference to FIGS. 9 to 12.

The provision unit 36 provides various kinds of information generated by the generation unit 35 to an advertisement distributor via the advertisement distributor terminal 50.

Figure 8:
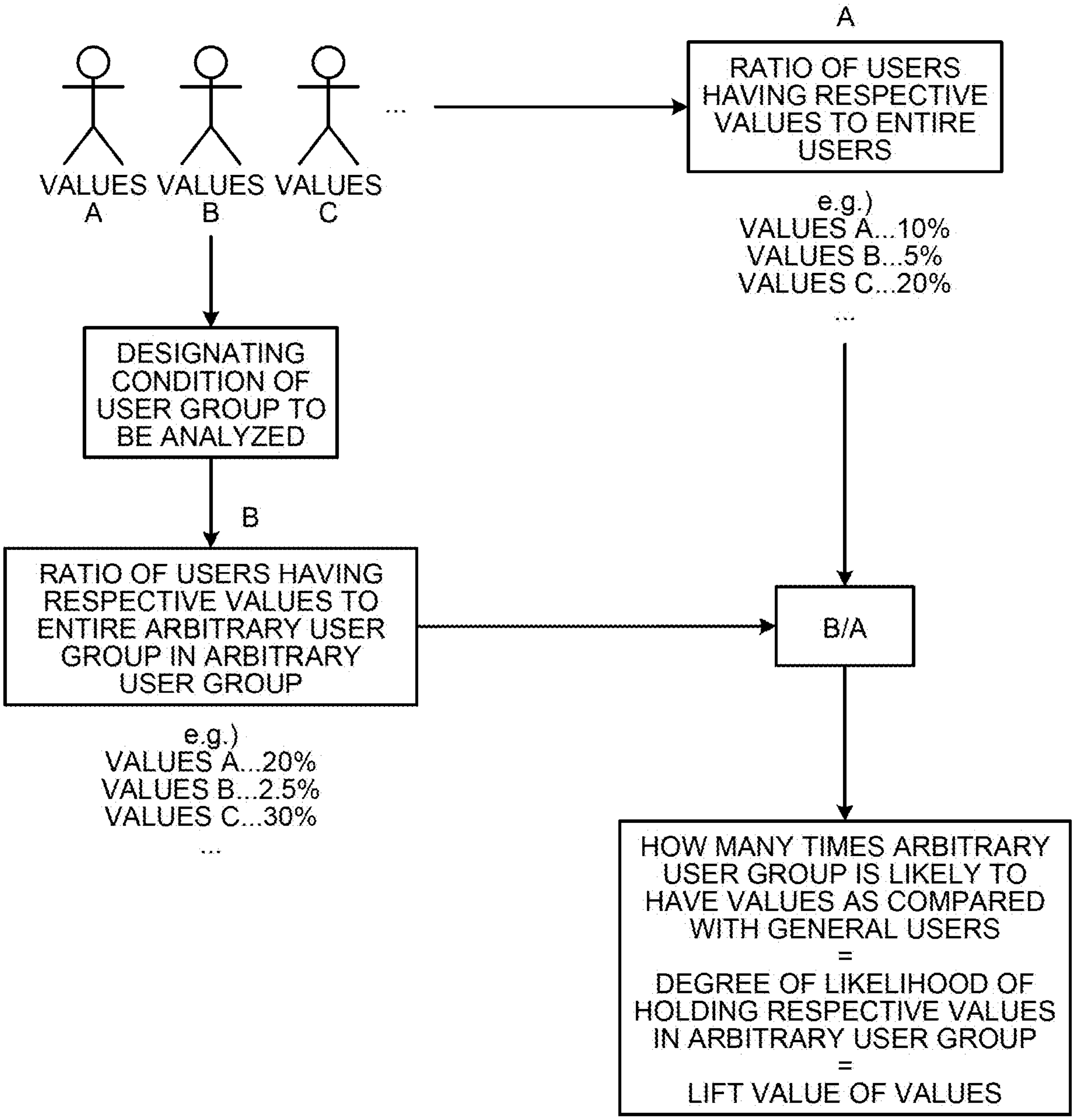
FIG. 8 is a diagram for explaining a method of calculating a lift value calculated by a specifying unit.

Next, a method of calculating the lift value will be described with reference to FIG. 8. FIG. 8 is a diagram for explaining a method of calculating a lift value calculated by the specifying unit 34.

The lift value is an index indicating the degree of likelihood of holding respective values in an arbitrary user group (user group set by the setting unit 32). In other words, the lift value is a numerical value indicating how many times the arbitrary user group is likely to have the values as compared with general users (all users), and the specifying unit 34 calculates the numerical value as a numerical value B/numerical value A.

Specifically, the numerical value A is a value indicating a ratio of users having respective values to the entire users. That is, for example, for values A, the numerical value A is calculated as the number of users having the values A among all users divided by the number of all users. The specifying unit 34 calculates the numerical value A for respective values. In the example illustrated in FIG. 8, the numerical value A is 10% for the values A, 5% for the values B, and 20% for the values C.

Next, the numerical value B is a numerical value indicating the ratio of users having respective values to the entire arbitrary user group in the arbitrary user group (user group set by the setting unit 32). That is, for example, for the values A, the numerical value B is calculated as the number of users having the values A among the arbitrary user group divided by the number of users in the arbitrary user group. The specifying unit 34 calculates the numerical value B for respective values. In the example illustrated in FIG. 8, the numerical value B is 20% for the values A, 2.5% for the values B, and 30% for the values C.

Then, the specifying unit 34 calculates the lift value from the above-described numerical value B/numerical value A. In the example illustrated in FIG. 8, the lift value of the values A is 20%/10%=2.0. In addition, the lift value of the values B is 2.5%/5%=0.5. In addition, the lift value of the values C is 30%/20%=1.5.

That is, in the example illustrated in FIG. 8, in an arbitrary user group, it can be grasped by calculating the lift value that the values A is the most likely held values and the values B is the most hardly held values.

In this way, by calculating the lift value, the specifying unit 34 can grasp which values a user of a certain user group likely holds and which values the user of the certain user group hardly holds (the likelihood of holding is not different from that of general users).

Next, content generated by the generation unit 35 will be described with reference to FIGS. 9 to 12. FIGS. 9 to 12 are diagrams illustrating content generated by the generation unit 35.

In FIGS. 9 to 12, content related to a group of users who have purchased beer A of company A (satisfied the user condition) and a group of users who have purchased beer B of company B (satisfied the user condition) is taken as an example. In the example illustrated in FIG. 9, "shop A lunch box, "sightseeing", "manzai (comedy) program A", and "BBQ" are specified as the search queries having high affinity with the positive values of the user group who have purchased beer A of company A. In addition, "beer voucher", "New Year's card", and "gyoza-take-out" are specified as the search queries having high affinity with the positive values of the user group who has purchased beer B of company B. Note that, in FIG. 9, an underlined search query means a search query in which the number of times of input by the user of the target user group is less than the threshold, and a search query without an underline means a search query in which the number of times of input by the user of the target user group is equal to or greater than the threshold. That is, the values that the users of the group of users who have purchased beer A of company A have mean that the users do not input "manzai program A" and "BBQ" much as the search queries despite having high affinity with the search queries for "manzai program A" and "BBQ", and mean that the users have high affinity with the search queries for "shop A lunch box" and "sightseeing" and input them as the search queries.

Figure 9:
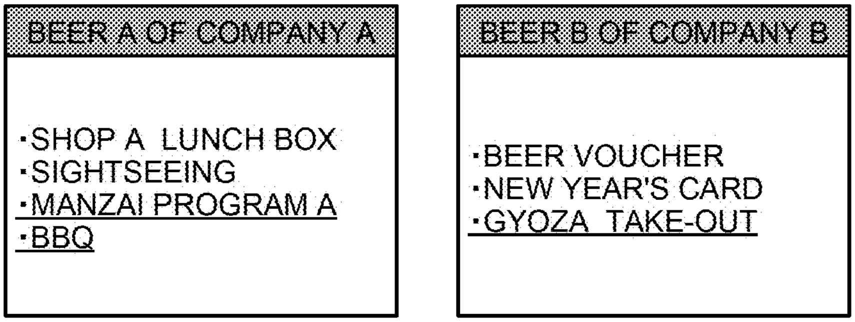
FIG. 9 is a view illustrating content generated by a generation unit.

The generation unit 35 generates information of the search query having high affinity with the positive values of the user as illustrated in FIG. 9 and provides the information by the provision unit 36, so that it is possible to make the advertisement distributor to grasp which search query should be in conjunction with to effectively distribute the advertisement.

Note that, although FIG. 9 illustrates an example in which the information of the search query having high affinity with the positive values of the user is provided, the information of the search query having high affinity with the negative values of the user may be provided. As a result, it is possible to make the advertisement distributor to grasp the search query that should not be linked with the advertisement (effect cannot be expected).

Figure 10:
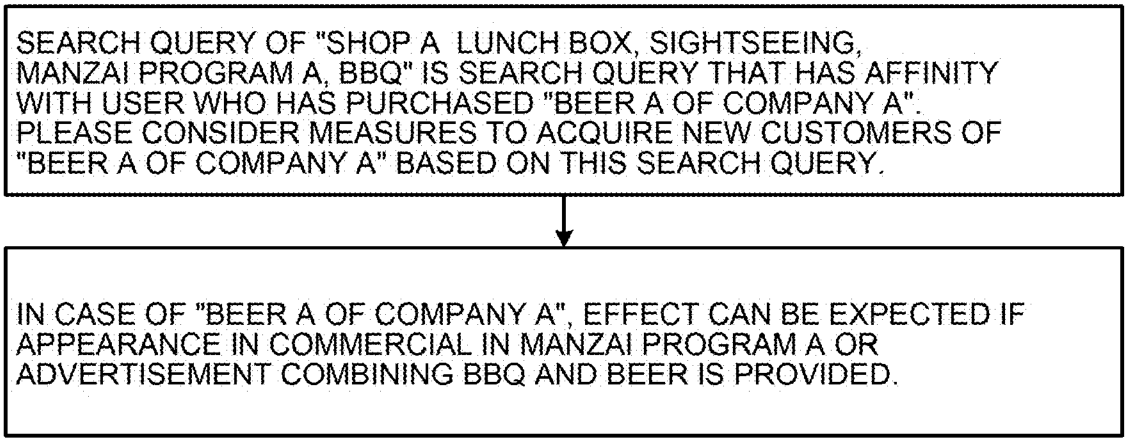
FIG. 10 is a view illustrating content generated by the generation unit.

Next, FIG. 10 illustrates a content example in a case of receiving a request for measures to acquire a new customer of beer A of company A (the user satisfies the user conditions) from a requester (an advertisement distributor, an employee of company A, or the like).

In the case of FIG. 10, the generation unit 35 creates a prompt including the information of the search queries illustrated in FIG. 9 and inputs the prompt to the model of the generative AI of the model information 44. Specifically, the generation unit 35 generates a prompt "The search query of "shop A lunch box, sightseeing, manzai program A, BBQ" is a search query that has affinity with the user who has purchased "beer A of company A. Please consider measures to acquire new customers of "beer A of company A based on the search query.", and input the prompt into the generative AI. Then, the generation unit 35 acquires an output of a text such as "In the case of "beer A of company A", an effect can be expected if an appearance in commercial in a manzai program A or an advertisement combining BBQ and beer is provided.", which is an output from the generative AI, and provides the text to the requester as content.

Figure 11:
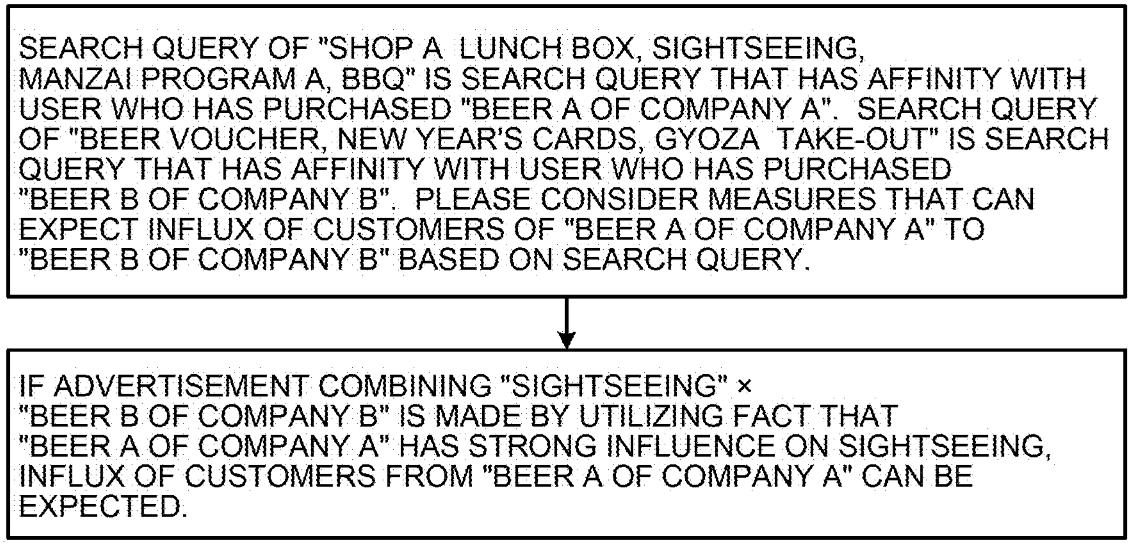
FIG. 11 is a view illustrating content generated by the generation unit.

Next, FIG. 11 illustrates a content example in a case of receiving a request for measures to cause a customer of beer A of company A to switch to beer B of company B (the user satisfies the user conditions) from a requester (an advertisement distributor, an employee of company B, or the like).

In the case of FIG. 11, the generation unit 35 creates a prompt including the information of the search queries illustrated in FIG. 9 and inputs the prompt to the model of the generative AI of the model information 44. Specifically, the generation unit 35 creates a prompt such as "The search query of "shop A lunch box, sightseeing, manzai program A, BBQ" is a search query that has affinity with the user who has purchased "beer A of company A". The search query of "beer voucher, New Year's cards, gyoza-take-out" is a search query that has affinity with the user who has purchased "beer B of company B". Please consider measures that can expect an influx of customers of "beer A of company A" to "beer B of company B" based on the search query.", and inputs the prompt to the generative AI. Then, the generation unit 35 acquires an output of a text that is an output from the generative AI, such as "If an advertisement combining "sightseeing"×"beer B of company B" is made by utilizing the fact that "beer A of company A" has strong influence on sightseeing, an influx of customers from "beer A of company A" can be expected." and provides the text to the requester as content.

In this manner, the generation unit 35 generates content indicating measures such as a sales strategy (advertisement strategy) on the basis of the search query having high affinity with the positive values of the user and provides the content by the provision unit 36, whereby effective measures can be provided to the requester.

Figure 12:
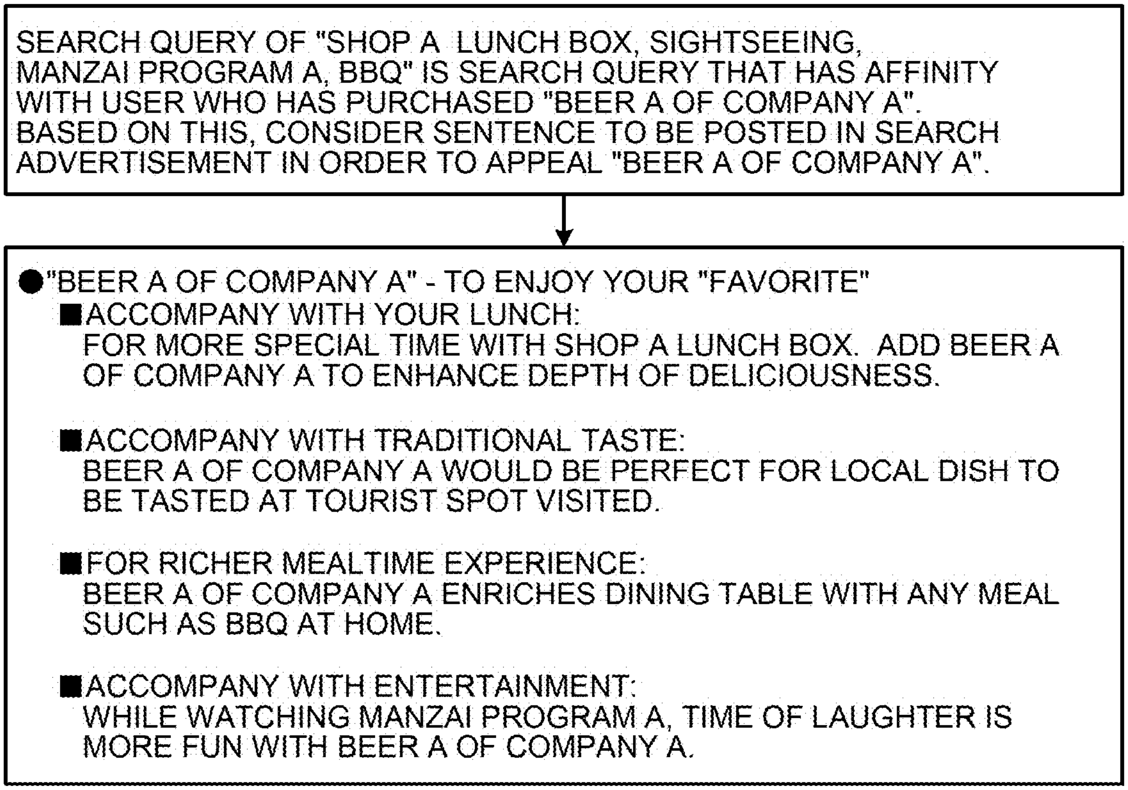
FIG. 12 is a view illustrating content generated by the generation unit.

Furthermore, in addition to the examples illustrated in FIGS. 10 and 11, for example, as illustrated in FIG. 12, a sentence to be posted in an advertisement may be provided as content.

Specifically, the generation unit 35 creates a prompt such as "The search query of "shop A lunch box, sightseeing, manzai program A, BBQ" is a search query that has affinity with the user who has purchased "beer A of company A". Based on this, consider the sentence to be posted in the search advertisement in order to appeal "beer A of company A". ", and inputs the prompt to the generative AI. Then, the generation unit 35 acquires, together with the title of "beer A of company A"—to enjoy your "favorite"" which is the output from the generative AI, output of texts such as "Accompany with your lunch: for a more special time with shop A lunch box. Add beer A of company A to enhance the depth of deliciousness.", "Accompany with a traditional taste: beer A of company A would be perfect for a local dish to be tasted at a tourist spot visited.", "For a richer mealtime experience: beer A of company A enriches the dining table with any meal such as BBQ at home.", and "Accompany with entertainment: While watching the manzai program A, a time of laughter is more fun with beer A of company A.", and provides the texts to the requester as content.

In this manner, the generation unit 35 generates the content indicating the sentence to be posted in the advertisement on the basis of the search query having high affinity with the positive values of the user and provides the content by the provision unit 36, so that it is possible to reduce the burden of the requester on the sentence creation work for creating the advertisement.

Figure 13:
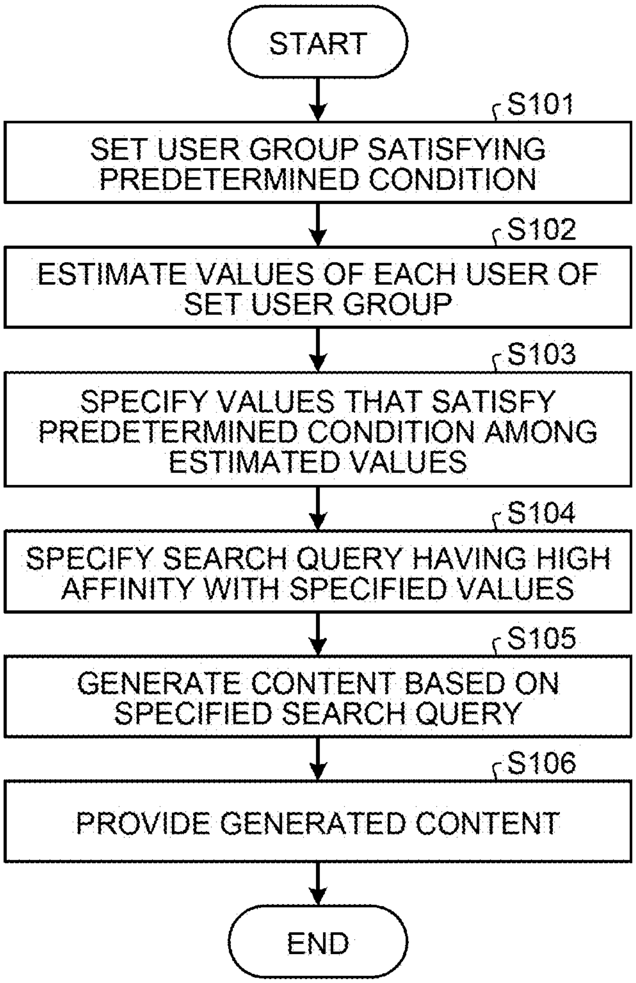
FIG. 13 is a flowchart illustrating a processing procedure of processing executed by the information processing apparatus according to the embodiment.

Next, with reference to FIG. 13, a processing procedure of processing executed by the information processing apparatus 1 according to the embodiment will be explained. FIG. 13 is a flowchart illustrating a processing procedure of processing executed by the information processing apparatus 1 according to the embodiment.

As illustrated in FIG. 13, the control unit 3 first sets a user group satisfying a predetermined condition on the basis of the log information acquired from the service providing apparatus 200 (step S101).

Subsequently, the control unit 3 estimates values of each user of the set user group (step S102).

Subsequently, the control unit 3 specifies values satisfying a predetermined condition among the estimated values (step S103).

Subsequently, the control unit 3 specifies a search query having high affinity with the specified values (step S104).

Subsequently, the control unit 3 generates content based on the specified search query (step S105), provides the generated content (step S106), and ends the process.

Others

In addition, among the processing described in the above embodiment, a part of the processing described as being automatically performed can be manually performed. Alternatively, all or part of the processing described as being performed manually can be automatically performed by a known method. In addition, the processing procedures, specific names, and information including various data and parameters illustrated in the document and the drawings can be arbitrarily changed unless otherwise specified. For example, the various types of information illustrated in each drawing are not limited to the illustrated information.

In addition, each component of each device illustrated in the drawings is functionally conceptual, and is not necessarily physically configured as illustrated in the drawings. That is, a specific form of distribution and integration of each device is not limited to the illustrated form, and all or a part thereof can be functionally or physically distributed and integrated in an arbitrary unit according to various loads, usage conditions, and the like.

For example, a part or all of the storage unit 4 illustrated in FIG. 3 may be held in a storage server or the like instead of being held by each device. In this case, each device acquires various types of information by accessing the storage server.

Hardware Configuration

Figure 14:
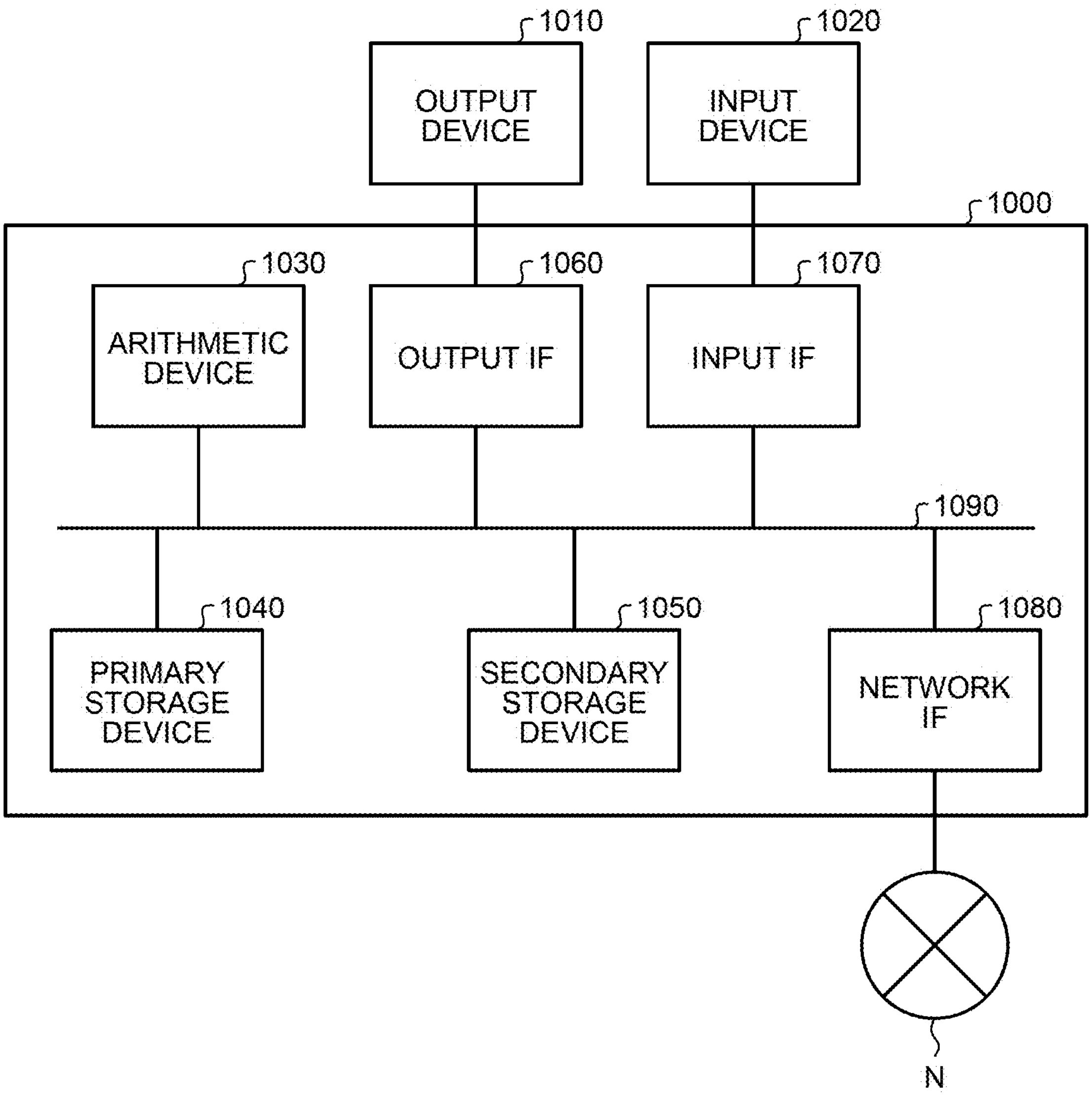
FIG. 14 is a diagram illustrating an example of a hardware configuration.

Furthermore, the information processing apparatus 1 according to the above-described embodiment is implemented by a computer 1000 having a configuration as illustrated in FIG. 14, for example. FIG. 14 is a diagram illustrating an example of a hardware configuration. The computer 1000 is connected to an output device 1010 and an input device 1020, and has a form in which an arithmetic device 1030, a primary storage device 1040, a secondary storage device 1050, an output interface (IF) 1060, an input IF 1070, and a network IF 1080 are connected by a bus 1090.

The arithmetic device 1030 operates on the basis of a program stored in the primary storage device 1040 or the secondary storage device 1050, a program read from the input device 1020, or the like, and executes various types of processing. The primary storage device 1040 is a memory device such as a RAM that temporarily stores data used for various calculations by the arithmetic device 1030. In addition, the secondary storage device 1050 is a storage device in which data used for various arithmetic operations by the arithmetic device 1030 and various databases are registered, and is implemented by a read only memory (ROM), a hard disk drive (HDD), a flash memory, and the like.

The output IF 1060 is an interface for transmitting information to be output to the output device 1010 that outputs various types of information such as a monitor and a printer, and is implemented by, for example, a connector of a standard such as a universal serial bus (USB), a digital visual interface (DVI), or a high definition multimedia interface (HDMI) (registered trademark). Furthermore, the input IF 1070 is an interface for receiving information from various input devices 1020 such as a mouse, a keyboard, and a scanner, and is implemented by, for example, a USB or the like.

Note that the input device 1020 may be, for example, a device that reads information from an optical recording medium such as a compact disc (CD), a digital versatile disc (DVD), or a phase change rewritable disk (PD), a magneto-optical recording medium such as a magneto-optical disk (MO), a tape medium, a magnetic recording medium, a semiconductor memory, or the like. Furthermore, the input device 1020 may be an external storage medium such as a USB memory.

The network IF 1080 receives data from another device via the network N and transmits the data to the arithmetic device 1030, and transmits data generated by the arithmetic device 1030 to another device via the network N.

The arithmetic device 1030 controls the output device 1010 and the input device 1020 via the output IF 1060 and the input IF 1070. For example, the arithmetic device 1030 loads a program from the input device 1020 or the secondary storage device 1050 onto the primary storage device 1040, and executes the loaded program.

For example, in a case where the computer 1000 functions as the information processing apparatus 1, the arithmetic device 1030 of the computer 1000 realizes the function of the control unit 3 by executing the program loaded on the primary storage device 1040.

Effects

As described above, the information processing apparatus 1 according to the embodiment includes the estimation unit 33 that estimates values of each user of a user group satisfying a predetermined user condition, the specifying unit 34 that specifies a search query having high affinity with values satisfying a predetermined values condition among the estimated values among search queries input in the past, and the provision unit 36 that provides content based on the specified search query.

According to the information processing apparatus 1 according to the embodiments described above, it is possible to effectively support content provision.

Although some of the embodiments of the present application have been described in detail with reference to the drawings, these are merely examples, and the present invention can be implemented in other forms subjected to various modifications and improvements based on the knowledge of those skilled in the art, including the aspects described in the disclosure of the invention.

OTHERS

In addition, among the processing described in the above embodiments, all or a part of the processing described as being automatically performed can be manually performed, or all or a part of the processing described as being manually performed can be automatically performed by a known method. In addition, the processing procedures, specific names, and information including various data and parameters illustrated in the document and the drawings can be arbitrarily changed unless otherwise specified. For example, the various types of information illustrated in each drawing are not limited to the illustrated information.

In addition, each component of each device illustrated in the drawings is functionally conceptual, and is not necessarily physically configured as illustrated in the drawings. That is, a specific form of distribution and integration of each device is not limited to the illustrated form, and all or a part thereof can be functionally or physically distributed and integrated in an arbitrary unit according to various loads, usage conditions, and the like.

In addition, each processing described in the above-described embodiments can be appropriately combined within a range in which the processing contents do not contradict each other.

In addition, the "part (section, module, unit)" described above can be read as "means", "circuit", or the like. For example, the control unit 3 can be replaced with a control means or a control circuit.

According to one aspect of the embodiment, there is an effect that effective support regarding content provision can be performed.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An information processing apparatus comprising:
a memory storing:
user information including behavior history,
values information including predefined values,
query information including past search queries, and
model information; and
at least one processor configured to execute instructions to:
set a user group satisfying a predetermined user condition based on the behavior history;
estimate values of each user of the user group by:
generating estimated content associated with the predefined values, and
calculating a similarity score between content related to the user and the estimated content;
determine values satisfying a predetermined values condition based on the similarity score;
calculate, for each value satisfying the predetermined values condition, a lift value defined as:
a ratio of users having the value in the user group divided by a ratio of users having the value in all users;
specify a search query having high affinity with a value whose lift value satisfies a predetermined lift threshold, from among search queries input in the past; and
generate content based on the specified search query and provide the generated content.

2. The information processing apparatus according to claim 1 wherein the user group satisfying the predetermined user condition is a user group who has performed a predetermined behavior.

3. The information processing apparatus according to claim 1, wherein the at least one processor is further configured to execute instructions to:
generate estimated content corresponding to predefined values related to a user having preset values, and calculate the similarity score between content related to the user and the estimated content, and
specify the search query having high affinity with the values whose similarity score is equal to or greater than a threshold.

4. The information processing apparatus according to claim 3, wherein the at least one processor is further configured to execute instructions to calculate the lift value that is a numerical value obtained by dividing a ratio of users having the values whose similarity score is equal to or greater than a threshold in the user group by a ratio of users having the values in all users, and specify the search query having high affinity based on the lift value.

5. The information processing apparatus according to claim 4, wherein the at least one processor is further configured to execute instructions to provide the content generated based on the search query whose a number of times of input by the user of the user group is less than a threshold among the search queries having high affinity.

6. The information processing apparatus according to claim 4, wherein the at least one processor is further configured to execute instructions to provide the content generated based on the search query whose a number of times of input by the user of the user group is equal to or greater than a threshold among the search queries having high affinity.

7. The information processing apparatus according to claim 4, wherein the at least one processor is further configured to execute instructions to provide the content indicating a measure for the user to satisfy the predetermined user condition based on the specified search query.

8. The information processing apparatus according to claim 1, wherein the predefined values include values classified into at least one of freedom, equality, benevolence, and harmony.

9. The information processing apparatus according to claim 1, wherein the predefined values are values based on Schwartz's value theory classified into power, achievement, hedonism, stimulation, self-determination, universality, benevolence, traditional, harmony, and safety.

10. The information processing apparatus according to claim 1, wherein the at least one processor is further configured to execute instructions to generate the estimated content by inputting a prompt including the predefined values to a generative AI model stored in the model information.

11. The information processing apparatus according to claim 1, wherein the similarity score is a vector similarity calculated using at least one of cosine similarity and Jaccard similarity.

12. The information processing apparatus according to claim 1, wherein the at least one processor is further configured to execute instructions to vectorize the search query and the value using Word2Vec, and specify that the search query and the value have high affinity when a vector similarity is equal to or greater than a threshold.

13. The information processing apparatus according to claim 1, wherein the at least one processor is further configured to execute instructions to determine whether the affinity between the search query and the value is high using a generative AI model.

14. The information processing apparatus according to claim 1, wherein the at least one processor is further configured to execute instructions to classify values having a lift value equal to or greater than a threshold as positive values, and classify values having a lift value less than the threshold as negative values.

15. The information processing apparatus according to claim 14, wherein the at least one processor is further configured to execute instructions to specify a search query having high affinity with the positive values and a search query having high affinity with the negative values.

16. The information processing apparatus according to claim 1, wherein the at least one processor is further configured to execute instructions to generate the content by inputting the specified search query as a prompt to a generative AI model stored in the model information.

17. The information processing apparatus according to claim 1, wherein the generated content indicates an advertisement strategy based on the specified search query.

18. The information processing apparatus according to claim 1, wherein the at least one processor is further configured to execute instructions to provide the generated content to an advertisement distributor terminal via a network.

19. An information processing method executed by a computer having a memory storing user information including behavior history, values information including predefined values, query information including past search queries, and model information, the method comprising the steps of:

- setting a user group satisfying a predetermined user condition based on the behavior history;
- estimating values of each user of the user group by:
  - generating estimated content associated with the predefined values, and
  - calculating a similarity score between content related to the user and the estimated content;
- determining values satisfying a predetermined values condition based on the similarity score;
- calculating, for each value satisfying the predetermined values condition, a lift value defined as:
  - a ratio of users having the value in the user group divided by a ratio of users having the value in all users;
- specifying a search query having high affinity with a value whose lift value satisfies a predetermined lift threshold, from among search queries input in the past; and
- generating content based on the specified search query and providing the generated content.

20. A non-transitory computer-readable storage medium having stored therein an information processing program causing a computer having a memory storing user information including behavior history, values information including predefined values, query information including past search queries, and model information to execute a process comprising:

- setting a user group satisfying a predetermined user condition based on the behavior history;
- estimating values of each user of the user group by:
  - generating estimated content associated with the predefined values, and
  - calculating a similarity score between content related to the user and the estimated content;
- determining values satisfying a predetermined values condition based on the similarity score;
- calculating, for each value satisfying the predetermined values condition, a lift value defined as:
  - a ratio of users having the value in the user group divided by a ratio of users having the value in all users;
- specifying a search query having high affinity with a value whose lift value satisfies a predetermined lift threshold, from among search queries input in the past; and
- generating content based on the specified search query and providing the generated content.

* * * * *